United States Patent [19]

Reinecke

[11] Patent Number: 5,013,095
[45] Date of Patent: May 7, 1991

[54] DUAL-CIRCUIT HYDRAULIC BRAKE CIRCUIT

[75] Inventor: Erich Reinecke, Burgdorf, Fed. Rep. of Germany

[73] Assignee: Wabco Westinghouse Fahrzeugbremsen GmbH, Hanover, Fed. Rep. of Germany

[21] Appl. No.: 421,036

[22] Filed: Oct. 13, 1989

[30] Foreign Application Priority Data

Oct. 22, 1988 [DE] Fed. Rep. of Germany ....... 3836079

[51] Int. Cl.$^5$ .............................................. B60T 8/42
[52] U.S. Cl. .................................... 303/113; 303/119
[58] Field of Search ................. 303/2, 10, 87, 92, 110, 303/113, 114, 115, 116

[56] References Cited

U.S. PATENT DOCUMENTS

| | | | |
|---|---|---|---|
| 4,807,943 | 2/1989 | Ogino | 303/116 X |
| 4,812,777 | 3/1989 | Shirai | 303/87 X |
| 4,844,558 | 7/1989 | Ishii et al. | 303/116 X |
| 4,898,432 | 2/1990 | Brown | 303/116 X |

OTHER PUBLICATIONS

Paper No. 865140, XXI Fisita Congress, Belgrade, Yugoslavia, Jun. 1986, *New Anti-Lock Braking System*, pp. 325-332.
Wabco-Hydraulic—ABS, *Automobil Revue 83*, 1988, No. 18, pp. 47-55.

Primary Examiner—Duane A. Reger
Attorney, Agent, or Firm—Horst M. Kasper

[57] ABSTRACT

The present invention provides a dual-circuit hydraulic brake system, which has a hydrostatic circuit and a servo circuit. The brake system also has an electronic anti-locking system, which is fed by the servo circuit. To cut off the master cylinder in case of a controlled braking and thereby to guarantee a closed circuit, an annular receptacle in the servo cylinders used for circuit separation is connected to a volume receptacle in case of a braking controlled by the anti-lock system. At the sametime, the master cylinder is cut off by means of a central valve.

37 Claims, 3 Drawing Sheets

DUAL-CIRCUIT HYDRAULIC BRAKE CIRCUIT

FIELD OF THE INVENTION

The present invention relates, in general, to vehicle brake systems and, more particularly, this invention relates to a dual-circuit brake system equipped with a hydrostatic circuit and a servo circuit and at least one servo cylinder for separating such hydrostatic circuit and such servo circuit from one another.

BACKGROUND OF THE INVENTION

Prior to the present invention, dual-circuit hydraulic brake systems have been used and taught in the prior art. See, for example, VISITA-PAPER 86 51 40, 1986, page 2, 265. The hydraulic brake system taught in this reference has a hydrostatic circuit which is fed from a master cylinder as a function of the force being exerted by a vehicle operator's foot. There is also provided a servo circuit in this hydraulic brake system. The servo circuit is supplied with hydraulic fluid from a hydraulic pressure source. Such hydraulic pressure source includes both a pump and a high pressure reservoir.

In this prior art hydraulic brake system, hydraulic fluid is communicated to the wheel brake cylinders from both the hydrostatic circuit and the servo circuit, during a brake application, by way of two servo cylinders. One of these two servo cylinders is associated with each wheel on the front axle. The hydrostatic circuit fed by the master cylinder is connected to an annular receptacle portion of such servo cylinder. This annular receptacle increases in size as the braking force being applied is increased. The servo circuit, that is, the hydraulic pressure source, is connected to a cylinder chamber disposed in the servo cylinder.

This hydraulic brake system requires the two servo cylinders to perform several distinct functions. On the one hand, for example, the servo cylinders separate the hydrostatic circuit and the servo circuit from one another. The separation of these circuits is necessary for safety reasons. On the other hand, these servo cylinders match the different pressure levels of the hydrostatic circuit and the servo circuit to one another. This matching of the different pressure levels present in these circuits is accomplished in this prior art hydraulic brake system by means of suitable translation ratios or by piston surfaces. Such servo cylinders also make possible the pressurization of the wheel brakes controlled by a respective one of such servo cylinders by the servo circuit pressure on the one hand and, simultaneously, by the master cylinder pressure on the other hand.

For the realization of an anti-locking function in the hydraulic brake system taught in the prior art, the servo cylinders are preceded by certain control valves positioned on the hydrodynamic booster side. These control valves can be magnetically activated by means of an electrical control signal supplied to them by an anti-lock electronic system. The locking of such wheel brakes is prevented in a manner which is well known in the braking art. In particular, in emergency braking conditions, it is of extreme importance to prevent such wheel brakes from locking. The anti-lock system is preferably designed as an individual regulation (IR) system. In an IR anti-lock brake system, each of the wheel brakes can be regulated individually.

As is known in the prior art, the hydraulic brake systems, as described above, can also be supplemented by two additional solenoid-controlled valves. Such additional solenoid-controlled valves are commonly known as separation valves. By means of these separation valves, in the case of a regulated or anti-lock braking application, the master cylinder can be separated from the servo cylinders by means of an appropriate control signal from the anti-lock electronic system. In this manner, undesirable feedback or pumping-type movement from the regulating anti-lock protection system to the brake pedal can be prevented. In addition to preventing such feedback, a disruptive influence on the regulation of the anti-lock braking system from the master cylinder is eliminated. Further, the annular receptacle portion of the servo cylinder is thereby connected directly to the pressure medium compensation reservoir of the hydraulic brake system. Such direct connection is necessary so that the brake pressure in the individual regulation cycles can be reduced down to a zero value if necessary.

This prior art dual-circuit hydraulic brake system design, however, has the disadvantage that the hydrostatic circuit can no longer be considered a closed system in the event the servo circuit is involved in an anti-lock brake operation. This circumstance presents the danger that the master cylinder can run at no load in the case of a defect or malfunction of one or both of the above-described supplementary solenoid-controlled valves.

SUMMARY OF THE INVENTION

The present invention provides a dual-circuit hydraulic brake system having both a hydrostatic circuit and a servo circuit. There is at least one servo cylinder provided for separating such hydrostatic circuit from such servo circuit. The servo circuit is connected for fluid communication with a master chamber or receptacle and the hydrostatic circuit is connected for fluid communication with an annular receptacle in such servo cylinder. The servo circuit is electrically connected to an electronically controlled anti-locking brake system by way of control valves. The pressure medium (hydraulic fluid) contained in the annular receptacle of such servo cylinder can be absorbed by a volume receptacle when the braking system is in the regulated status. Such volume receptacle has a variable volume.

OBJECTS OF THE INVENTION

It is, therefore, one of the primary objects of the present invention to provide a dual-circuit hydraulic brake system configuration in which the hydrostatic circuit portion of such brake system remains closed during a regulated brake application.

Another object of the present invention is to provide a dual-circuit hydraulic brake system which is more reliable during operation.

In addition to the above-described objects and advantages of the dual-circuit hydraulic brake system according to the present invention, various other objects and advantages of such invention will become more readily apparent to those persons who are skilled in the braking art from the following more detailed description when such description is taken in conjunction with the attached drawing Figures and with the attached claims.

BRIEF DESCRIPTION OF THE INVENTION

Figure 1:
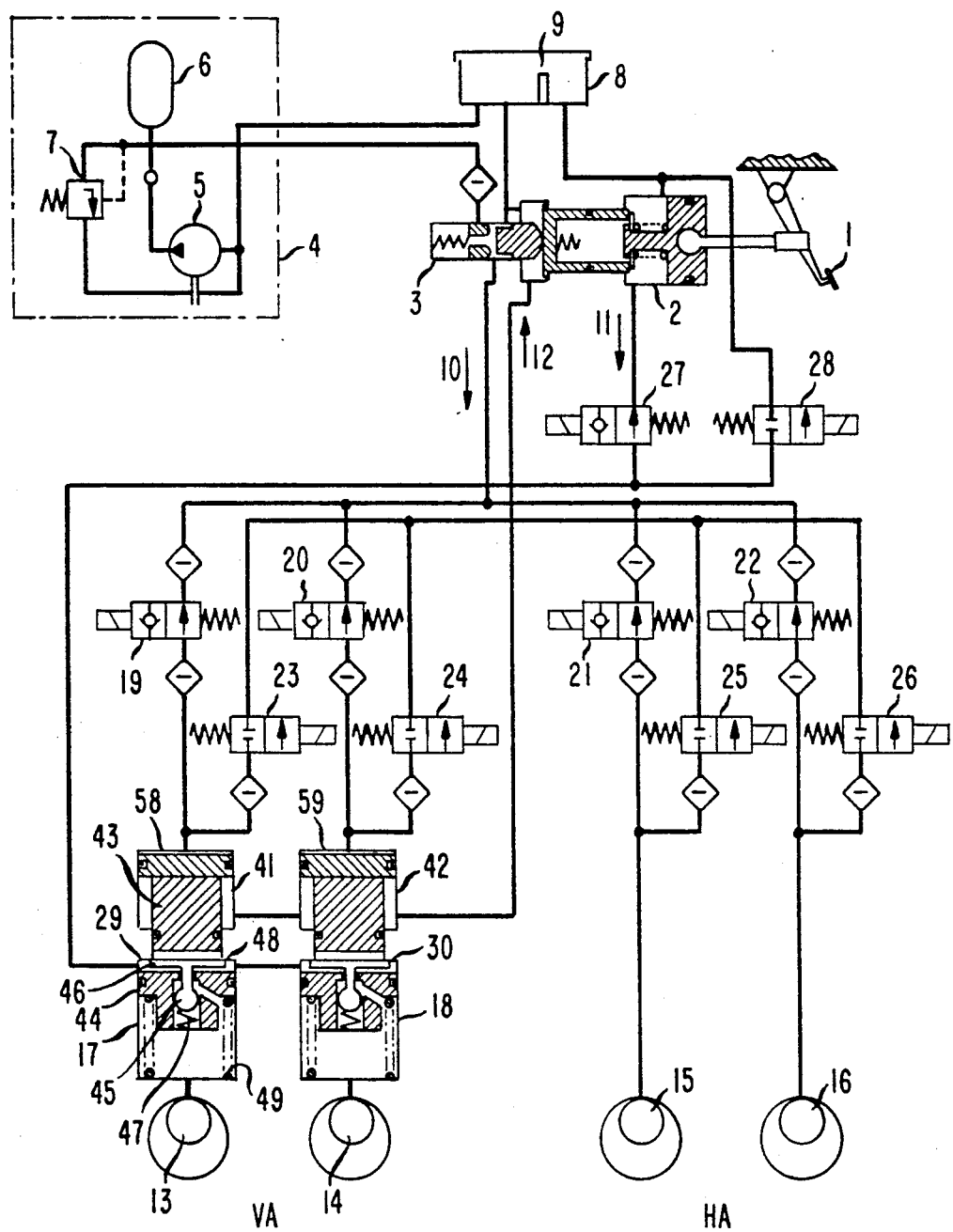
FIG. 1 is a schematic diagram which illustrates a dual-circuit hydraulic brake system constructed according to the prior art.

Prior to proceeding to a more detailed description of the dual-circuit hydraulic brake system constructed according to both the prior art and the present invention, it should be noted that identical components which have identical function have been identified with identical reference numerals throughout the several drawing Figures for the sake of clarity.

Reference is now made to FIG. 1 for an understanding of the construction and operation of the prior art type dual-circuit hydraulic brake system.

To apply the brake, the operator of the vehicle exerts a force on a brake pedal 1. Such brake pedal 1 is connected to a master cylinder 2, as is commonly the practice in the prior art. Such master cylinder 2 is connected to a pressure medium compensation reservoir 8. When the master cylinder 2 is activated by the operator exerting a force on the brake pedal 1, pressure medium flow is by way of a hydrostatic circuit 11 into the lower portion 29 and 30 of two of the servo cylinders 17 and 18, respectively, associated with the front axle VA of the vehicle. The lower portion 29 and 30 of the respective servo cylinders 17 and 18 serve as annular receptacles.

A piston disposed in the master cylinder 2 also activates a booster valve 3, as is also commonly the practice in the prior art. The booster valve 3 is connected at an inlet port thereof to a hydraulic pressure source 4. The hydraulic pressure source 4 comprises a pump 5 and a fluid reservoir 6, a relief valve 7, and a number of manametric switches (not shown) to regulate the desired hydraulic pressure. Generally, the hydraulic pressure will be between about 100 bar and 200 bar.

The supply of fluid to the pressure source 4 and to the master cylinder 2 takes place from the compensation reservoir 8. In order to separate the hydrostatic circuit 11 from the servo circuit 10, such compensation reservoir 8 includes a partition 9 disposed therein.

The output port of the booster valve 3 is connected to the servo circuit 10. Such servo circuit 10 leads by way of the anti-lock inlet valve 19 and 20 to the master receptacle 58 and 59 of such above-mentioned servo cylinders 17 and 18, respectively.

The servo circuit 10 is also connected via the anti-lock inlet valves 21 and 22 to respective brake cylinders 15 and 16 on the rear axle HA of the vehicle. The anti-locking system also includes outlet valves 23, 24, 25 and 26, which are connected to a return line 12. The return line 12 leads to the compensation reservoir 8. Also connected to the return line 12 are the ventilating annular receptacles 41 and 42 of the respective servo cylinders 17 and 18.

The above-mentioned servo cylinders 17 and 18 each contain two partial pistons 43 and 44 positioned therein. These partial pistons 43 and 43 are rigidly connected to one another. In a centrally located bore formed in the lower partial pistons 43 and 44, a ball valve 45 is positioned. Such ball valve 45 is connected to a transverse rod 46. This transverse rod 46 is urged against a stop 48 formed on the housing of servo cylinders 17 and 18 by a spring 47 acting on the ball valve 45. In addition, the partial pistons 43 and 44 are urged in an upwardly direction into the rest position illustrated in the drawings by another spring 49.

As a consequence of the slightly different diameters of the partial pistons 43 and 44, a ventilation space on an annular receptacle 29 and 30 is formed when such partial pistons 43 and 44 move in a downwardly direction. These annular receptacles 29 and 30 are connected by means of separation valves 27 and 28 with the master cylinder 2 or with the compensation reservoir 8.

Each of the above-described valves is designed as solenoid-controlled valves. These solenoid-controlled valves are electrically connected to an anti-locking electronic system (not shown) in a manner which is known in the braking art. The anti-locking electronic system, by means of wheel speed sensors (not shown), receives electrical signals representative of the rotation and speed of the wheels. Such electronic system activates, by means of electrical signals, the solenoid-controlled valves, i.e., inlet and outlet valves 19 through 26, in a manner such that an undesirable locking of such wheels is prevented.

The operation of this prior art dual-circuit hydraulic brake system, illustrated in FIG. 1, will now be described in detail below.

During normal operation, that is, when the brake anti-locking system is not in operation, each of the above-described valves is in the position illustrated. When the brake pedal 1 is activated by the operator of the vehicle, hydraulic fluid under pressure travels from the master cylinder 2 by way of the hydrostatic circuit 11 into the annular receptacles 29 and 30 of the respective servo cylinders 17 and 18. Substantially at the same point in time, hydraulic fluid under pressure travels from the booster valve 3 by way of the servo circuit 10 to the servo cylinders 17 and 18. This results in the partial pistons 43 and 44 being pushed in a downwardly direction. The downward movement of the partial pistons 43 and 44 causes the ball valve 45, positioned in partial piston 44, to be closed Thereafter, the hydraulic fluid is propagated toward the wheel brake cylinders 13 and 14.

It is evident that the braking action of the hydrostatic circuit 11 is, therefore, assisted by the servo circuit 10, because such servo circuit 10 acts by way of the open anti-locking inlet valves 19 and 20 on the upper portion of the partial piston 43 disposed in the servo cylinders 17 and 18 on the front axle VA of the vehicle. At substantially the same point in time, the brake pressure is transmitted, by way of the opened anti-locking inlet valves 21 and 22, to the brake cylinders 15 and 16 on the rear axle HA of the vehicle.

Now consider the situation which requires the anti-locking system to be activated. In this case, the electronic system of such anti-locking system first brings about a change in the position of the separation valves 27 and 28. As a result of such change of position of the separation valves 27 and 28, the master cylinder 2 is separated from the annular receptacles 29 and 30. Such separation of the master cylinder 2 from the annular receptacles 29 and 30 prevents pumping of the brake pedal 1. At the same time, by way of the now open separation valve 28, a connection is established between the annular receptacles 29 and 30 to reduce the pressure to zero.

Therefore, the brake cylinders are generally activated only by the servo circuit 10. The servo circuit 10 acts by way of servo cylinders 17 and 18 on the brake cylinders 13 and 14 on the front axle VA and directly on the brake cylinders 15 and 16 on the rear axle HA.

As is generally the common practice in the prior art, if the electronic system portion of the anti-locking system detects a tendency of one or more individual wheels to lock, the corresponding inlet valve will be closed and the corresponding outlet valve will be opened. In this manner, the brake pressure in the affected brake cylinder can be reduced by way of the return line 12 to the compensation reservoir 8.

In this prior art dual-circuit hydraulic brake system, the hydrostatic circuit 11 can no longer be considered a closed system in the strict sense. The reason is that if there is a defect or malfunction of the separation valve 27, for example, or a defective electrical activation of this separation valve 27, which allows the separation valve 27 to remain in the open position, the contents of the master cylinder 2 can flow into such compensation reservoir 8. It is also significant to note that this can also happen even if the anti-lock system is not in operation, and the other separation valve 28 is unintentionally placed in the opened position.

This undesirable situation is prevented in the dual-circuit hydraulic brake system constructed according to the present invention, and which will now be discussed with reference to FIGS. 2 and 3 of the drawings.

Figure 2:
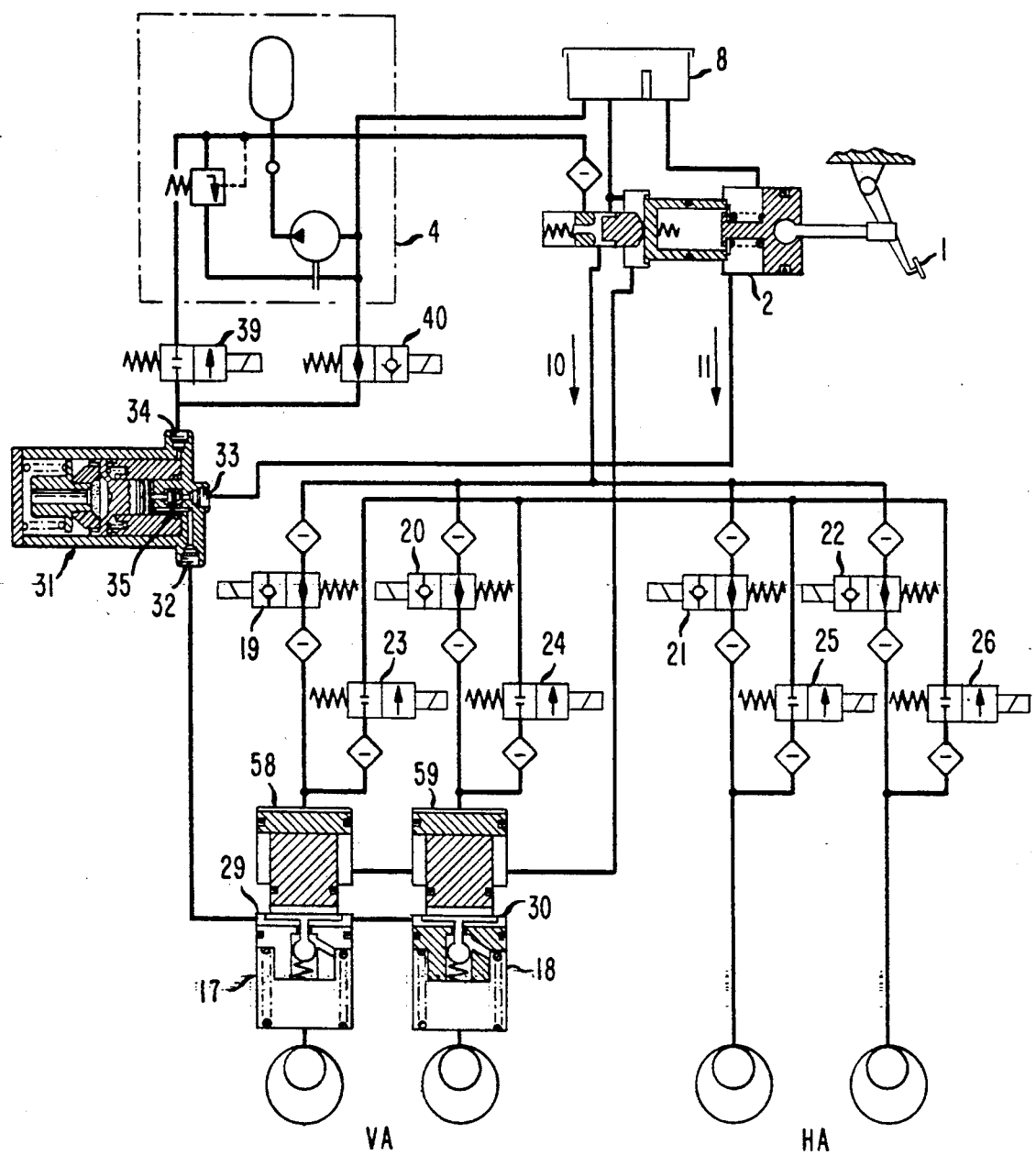
FIG. 2 is a schematic diagram which illustrates a dual-circuit hydraulic brake system constructed according to the present invention.

As can be seen in FIG. 2, the separation valves 27 and 28 as well as the fluid connection from the master cylinder 2, by way of such above-mentioned separation valves 27 and 28 to the compensation reservoir 8, have been eliminated.

In the connecting line located between the master cylinder 2 and the annular receptacles 29 and 30, a so-called volume receptacle 31 has now been inserted. The internal construction of this volume receptacle 31 is illustrated in greater detail in FIG. 3.

Figure 3:
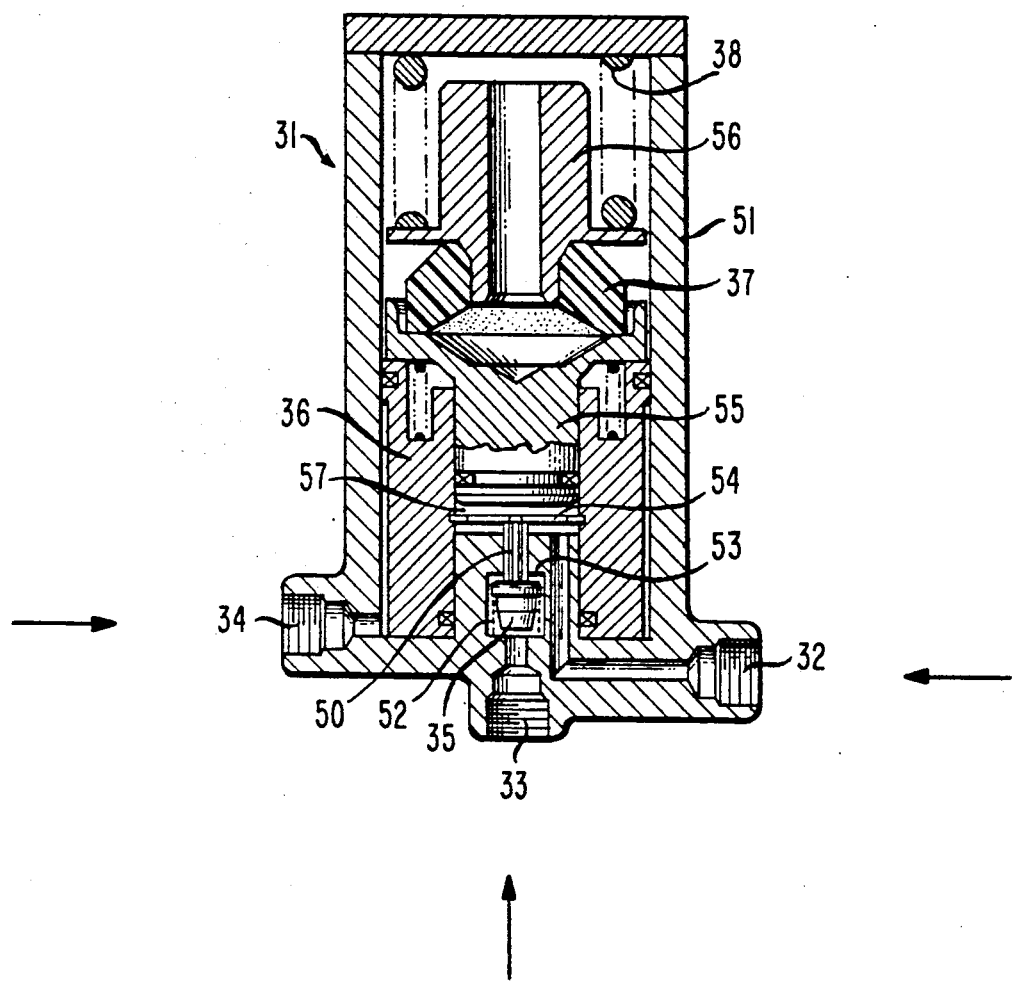
FIG. 3 is an enlarged cross-sectional view which illustrates the volume receptacle illustrated in FIG. 2.

Now referring more particularly to FIG. 3, it can be seen that the volume receptacle 31 includes a ring piston 36 disposed for reciprocal movement in a housing member 51. Such ring piston 36 can be displaced against the force of a pair of springs 37 and 38, which are assembled in series. The spring 37 is an elastic spring, and the spring 38 is a steel spring. The steel spring 38 is, therefore, significantly stronger than the elastic spring 37. The ring piston 36 is braced against an intermediate piston 55. In turn, the intermediate piston 55 is braced against the elastic spring 37. The steel spring 38 is mounted on a support body 56.

The volume receptacle 31 includes three hydraulic connections designated 32, 33 and 34. The first hydraulic connection 32 is connected for fluid communication with the annular receptacle 29 and 30 of the servo cylinders 17 and 18, respectively. The second hydraulic connection 33 is connected for fluid communication with the master cylinder 2. The third hydraulic connection 34 is connected for fluid communication with the pressure medium source 4 by way of solenoid-controlled valves 39 and 40.

A check valve 35 is disposed behind the second hydraulic connection 33. This check valve 35 is normally urged against a seal seat 53 by means of a compression spring 52. The check valve 35 is normally urged against a seal seat 53 by means of a compression spring 52. The check valve 35 is held open in the rest position by a rod-like member 50. Such rod-like member 50 is supported on a perforated disc 54. Such perforated disc 54 is fastened inside the piston ring 36.

In place of the above-described volume receptacle 31, having a hydraulic drive, a volume receptacle equipped with an electromatic drive, can also be used. One such volume receptacle having an electromatic drive, which can be used in this dual-circuit hydraulic brake system, is disclosed in DE-PS 36 030 74.

The operation of the volume receptacle, illustrated in FIGS. 2 and 3, will now be discussed in some greater detail below.

During normal unregulated braking action, there is a fluid connection established between the first hydraulic connection 32 and the second hydraulic connection 33. This fluid connection is established by way of the rod-like member 50 maintaining the check valve 35 in the open position. Consequently, an unregulated braking operation can be performed by the master cylinder 2 with the added assistance of the servo circuit 10. In this case, the elastic spring 37 acts as a movement simulator for the brake pedal In other words, the elastic spring 37 is compressed as a function of the force being operated on the brake pedal 1 by the operator of the vehicle. This compression of the elastic spring 37 will normally occur in a pressure range up to approximately 40 bar. Furthermore, the steel spring 38 will initially remain in the rest position in such unregulated braking operation.

However, as soon as the anti-lock system is required to begin regulation of the braking action during, for example, an emergency braking situation or on slippery road surfaces, the solenoid-controlled valve 39 and an additional solenoid-controlled valve 40 are reversed. The solenoid-controlled valve 40 connects the third hydraulic connection 33 of the volume receptacle 31 to the compensation reservoir 8. Hydraulic fluid under pressure is thereby transmitted from the pressure source 4 ahead of the piston ring 36 disposed in the volume receptacle 31. The pressure of this hydraulic fluid is defined such that the force exerted by the steel spring 38 is approximately offset. This pressure is approximately 130 bar. In the volume receptacle 31, the ring piston 36, the intermediate piston 55, and the support body 56 for the steel spring 38 are all urged to the left and the elastic spring 37 is compressed.

The pressure medium from the annular receptacles 29 and 30 of the respective servo cylinders 17 and 18 can now be communicated into the volume receptacle 31. That is, such annular receptacle can be ventilated. Thus, the free mobility of the partial pistons 43 and 44 disposed in the servo cylinders 17 and 18 can be assured.

Substantially at the same time, the check valve 35 closes. Such check valve 35 closes at this time because it is no longer held in the open position by the piston 36 and the perforated disc 54 by way of the rod-like member 50. In this manner, the master cylinder 2, connected to the second hydraulic connection 33 of the volume receptacle 31, is uncoupled. At this point, the brake pedal 1 becomes rigid. In other words, the brake pedal 1 cannot be moved any further by the operator of the vehicle.

Under these conditions, the hydrostatic circuit H is decoupled. That is, the hydrostatic circuit H no longer acts on the servo cylinders 17 and 18. The decoupling, however, occurs without having to open the hydrostatic circuit H in the direction of the return. Consequently, in the present invention, the "completely closed" system is maintained.

Although a presently preferred embodiment of the dual-circuit hydraulic brake system, according to the present invention, has been described in detail above, it should be obvious to those persons who are skilled in the braking art that various other modifications and adaptations of such dual-circuit hydraulic brake system may be made without departing from the spirit and scope of the appended claims.

I claim:

1. A dual-circuit hydraulic brake system, said dual-circuit hydraulic brake system comprising:
   (a) at least one servo cylinder, said at least one servo cylinder including:
      (i) a master receptacle disposed therein adjacent to a first end of the servo cylinder which receives a first portion of a pressure medium therein during a brake application, and
      (ii) an annular receptacle disposed therein intermediate to said first end of the servo cylinder, and a second end of the servo cylinder which receives a second portion of said pressure medium during an unregulated brake application;
   (b) a hydrostatic circuit connected to communicate said second portion of said pressure medium to said annular receptacle in said at least one servo cylinder during said unregulated brake application;
   (c) a servo circuit connected to communicate said first portion of said pressure medium to said master receptacle in said at least one servo cylinder during said brake application, said at least one servo cylinder separates said hydrostatic circuit from said servo circuit;
   (d) an electrically controlled anti-locking brake system having at least two solenoid-controlled valves disposed in said servo circuit for controlling said first portion of said pressure medium being communicated to said master receptacle in said at least one servo cylinder during said brake application;
   (e) a volume receptacle means disposed in said hydrostatic circuit for absorbing at least a portion of said second portion of said pressure medium present in said annular receptacle in said at least one servo cylinder when said dual brake application by said electrically controlled anti-locking brake system; and
   (f) a means disposed in said volume receptacle for varying a volume capacity of said volume receptacle.

2. A dual-circuit hydraulic brake system, according to claim 1, wherein said means disposed in said volume receptacle for varying said volume capacity includes:
   (a) a piston means positioned for reciprocal movement within said volume receptacle for varying said volume capacity;
   (b) a spring means positioned to engage said piston means for resisting movement of said piston means in a predetermined direction; and
   (c) a piston propulsion system for moving said piston means in said predetermined direction, said propulsion system being operated by an external energy source.

3. A dual-circuit hydraulic brake system, according to claim 2, wherein said propulsion system is a hydraulic piston.

4. A dual-circuit hydraulic brake system, according to claim 3, wherein said dual-circuit hydraulic brake system further includes a master cylinder, and said volume receptacle further includes a check valve means disposed therein for establishing a fluid communication connection between said master cylinder and said annular receptacle in said at least one servo cylinder during said unregulated brake application and for shutting off said fluid communication connection between said master cylinder and said annular receptacle in said at least one servo cylinder during said regulated brake application.

5. A dual-circuit hydraulic brake system, according to claim 4, wherein said dual-circuit hydraulic brake system further includes a fluid pressure source and said annular receptacle in said at least one servo cylinder is connected to a first hydraulic connection of said volume receptacle, and said master cylinder is connected to a second hydraulic connection of said volume cylinder, and said fluid pressure source is connected to a third hydraulic connection of said volume receptacle, so that during said regulated brake application said piston means is urged against a force exerted by said spring means to establish a ventilation receptacle for said at least a portion of said second portion of said pressure medium being forced out of said annular receptacle in said at least one servo cylinder during said regulated brake application.

6. A dual-circuit hydraulic brake system, according to claim 5, wherein said volume receptacle further includes a motion simulator means disposed therein for simulating motion of a brake pedal.

7. A dual-circuit hydraulic brake system, according to claim 6, wherein said motion simulator means includes:
   (a) an intermediate piston; and
   (b) an elastic spring.

8. A dual-circuit hydraulic brake system, according to claim 7, wherein said piston means and said spring means and said intermediate piston and said elastic spring are aligned in series.

9. A dual-circuit hydraulic brake system, according to claim 3, wherein said dual-circuit hydraulic brake system further includes a master cylinder, and said volume receptacle further includes a check valve means disposed therein for establishing a fluid communication connection between said master cylinder and said annular receptacle in said at least one servo cylinder during said unregulated brake application and for shutting off said fluid communication connection between said master cylinder and said annular receptacle in said at least one servo cylinder during said regulated brake application.

10. A dual-circuit hydraulic brake system, according to claim 9, wherein said dual-circuit hydraulic brake system further includes a fluid pressure source and said annular receptacle in said at least one servo cylinder is connected to a first hydraulic connection of said volume receptacle, and said master cylinder is connected to a second hydraulic connection of said volume cylinder, and said fluid pressure source is connected to a third hydraulic connection of said volume receptacle, so that during said regulated brake application said piston means is urged against a force exerted by said spring means to establish a ventilation receptacle for said at least a portion of said second portion of said pressure medium being forced out of said annular receptacle in said at least one servo cylinder during said regulated brake application.

11. A dual-circuit hydraulic brake system, according to claim 10, wherein said volume receptacle further includes a motion simulator means disposed therein for simulating motion of a brake pedal.

12. A dual-circuit hydraulic brake system, according to claim 11, wherein said motion simulator means includes:
(a) an intermediate piston; and
(b) an elastic spring.

13. A dual-circuit hydraulic brake system, according to claim 12, wherein said piston means and said spring means and said intermediate piston and said elastic spring are aligned in series.

14. A dual-circuit hydraulic brake system, according to claim 3, wherein said volume receptacle further includes a motion simulator means disposed therein for simulating motion of a brake pedal.

15. A dual-circuit hydraulic brake system, according to claim 14, wherein said motion simulator means includes:
(a) an intermediate piston; and
(b) an elastic spring.

16. A dual-circuit hydraulic brake system, according to claim 15, wherein said piston means and said spring means and said intermediate piston and said elastic spring are aligned in series.

17. A dual-circuit hydraulic brake system, according to claim 2, wherein said dual-circuit hydraulic brake system further includes a master cylinder, and said volume receptacle further includes a check valve means disposed therein for establishing a fluid communication connection between said master cylinder and said annular receptacle in said at least one servo cylinder during said unregulated brake application and for shutting off said fluid communication connection between said master cylinder and said annular receptacle in said at least one servo cylinder during said regulated brake application.

18. A dual-circuit hydraulic brake system, according to claim 2, wherein said dual-circuit hydraulic brake system further includes a master cylinder, and said volume receptacle further includes a check valve means disposed therein for establishing a fluid communication connection between said master cylinder and said annular receptacle in said at least one servo cylinder during said unregulated brake application and for shutting off said fluid communication connection between said master cylinder and said annular receptacle in said at least one servo cylinder during said regulated brake application.

19. A dual-circuit hydraulic brake system, according to claim 18, wherein said dual-circuit hydraulic brake system further includes a fluid pressure source and said annular receptacle in said at least one servo cylinder is connected to a first hydraulic connection of said volume receptacle, and said master cylinder is connected to said second hydraulic connection of said volume cylinder, and said fluid pressure source is connected to a third hydraulic connection of said volume receptacle, so that during said regulated brake application said piston means is urged against a force exerted by said spring means to establish a ventilation receptacle for said at least a portion of said second portion of said pressure medium being forced out of said annular receptacle in said at least one servo cylinder during said regulated brake application.

20. A dual-circuit hydraulic brake system, according to claim 19, wherein said volume receptacle further includes a motion simulator means disposed therein for simulating motion of a brake pedal.

21. A dual-circuit hydraulic brake system, according to claim 20, wherein said motion simulator means includes:
(a) an intermediate piston; and
(b) an elastic spring.

22. A dual-circuit hydraulic brake system, according to claim 21, wherein said piston means and said spring means and said intermediate piston and said elastic spring are aligned in series.

23. A dual-circuit hydraulic brake system, according to claim 2, wherein said volume receptacle further includes a motion simulator means disposed therein for simulating motion of a brake pedal.

24. A dual-circuit hydraulic brake system, according to claim 23, wherein said motion simulator means includes:
(a) an intermediate piston; and
(b) an elastic spring.

25. A dual-circuit hydraulic brake system, according to claim 24, wherein said piston means and said spring means and said intermediate piston and said elastic spring are aligned in series.

26. A dual-circuit hydraulic brake system, according to claim 1, wherein said dual-circuit hydraulic brake system further includes a master cylinder, and said volume receptacle further includes a check valve means disposed therein for establishing a fluid communication connection between said master cylinder and said annular receptacle in said at least one servo cylinder during said unregulated brake application and for shutting off said fluid communication connection between said master cylinder and said annular receptacle in said at least one servo cylinder during said regulated brake application.

27. A dual-circuit hydraulic brake system, according to claim 17, wherein said dual-circuit hydraulic brake system further includes a fluid pressure source, and said annular receptacle in said at least one servo cylinder is connected to a first hydraulic connection of said volume receptacle, and said master cylinder is connected to a second hydraulic connection of said volume cylinder, and said fluid pressure source is connected to a third hydraulic connection of said volume receptacle, so that during said regulated brake application said piston means is urged against a force exerted by said spring means to establish a ventilation receptacle for said at least a portion of said second portion of said pressure medium being forced out of said annular receptacle in said at least one servo cylinder during said regulated brake application.

28. A dual-circuit hydraulic brake system, according to claim 27, wherein said dual-circuit hydraulic brake system further includes at least one solenoid-controlled separation valve disposed in a fluid communication line located between said pressure source and said third hydraulic connection of said volume receptacle which, during said regulated brake application, can be electrically reversed by said electrically controlled anti-locking brake system.

29. A dual-circuit hydraulic brake system, according to claim 28, wherein said volume receptacle further includes a motion simulator means disposed therein for simulating motion of a brake pedal.

30. A dual-circuit hydraulic brake system, according to claim 29, wherein said motion simulator means includes:
(a) an intermediate piston; and
(b) an elastic spring.

31. A dual-circuit hydraulic brake system, according to claim 30, wherein said piston means and said spring means and said intermediate piston and said elastic spring are aligned in series.

32. A dual-circuit hydraulic brake system, according to claim 27, wherein said volume receptacle further includes a motion simulator means disposed therein for simulating motion of a brake pedal.

33. A dual-circuit hydraulic brake system, according to claim 32, wherein said motion simulator means includes:
 (a) an intermediate piston; and
 (b) an elastic spring.

34. A dual-circuit hydraulic brake system, according to claim 33, wherein said piston means and said spring means and said intermediate piston and said elastic spring are aligned in series.

35. A dual-circuit hydraulic brake system, according to claim 1, wherein said volume receptacle further includes a motion simulator means disposed therein for simulating motion of a brake pedal.

36. A dual-circuit hydraulic brake system, according to claim 35, wherein said motion simulator means includes:
 (a) an intermediate piston; and
 (b) an elastic spring.

37. A dual-circuit hydraulic brake system, according to claim 36, wherein said means disposed in said volume receptacle for varying said volume capacity and said intermediate piston and said elastic spring are aligned in series.

* * * * *